US009065135B2

(12) United States Patent
Choy et al.

(10) Patent No.: US 9,065,135 B2
(45) Date of Patent: Jun. 23, 2015

(54) CATHODE ACTIVE MATERIAL FOR SECONDARY BATTERY AND LITHIUM SECONDARY BATTERY INCLUDING THE SAME

(75) Inventors: Sang Hoon Choy, Daejeon (KR); Yong Tae Lee, Jeonju-si (KR); Hong Kyu Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 119 days.

(21) Appl. No.: 13/611,408

(22) Filed: Sep. 12, 2012

(65) Prior Publication Data

US 2013/0202946 A1  Aug. 8, 2013

Related U.S. Application Data

(63) Continuation of application No. PCT/KR2011/002828, filed on Apr. 20, 2011.

(30) Foreign Application Priority Data

Apr. 21, 2010 (KR) ........................ 10-2010-0036766

(51) Int. Cl.
 *H01M 4/525* (2010.01)
 *B60L 11/18* (2006.01)
 (Continued)

(52) U.S. Cl.
 CPC ........... *H01M 4/525* (2013.01); *B60L 11/1879* (2013.01); *B60L 2200/12* (2013.01); *B60L 2200/30* (2013.01); *C01B 25/37* (2013.01); *H01M 4/5825* (2013.01); *Y02T 10/7011* (2013.01); *Y02T 10/705* (2013.01); *C01P 2004/03* (2013.01); *C01P 2006/40* (2013.01); *B60L 2240/545* (2013.01); *C01B 25/45* (2013.01); *C01B 25/455* (2013.01); *Y02T 10/7005* (2013.01)

(58) Field of Classification Search
 CPC . H01M 4/5825; H01M 4/525; B60L 11/1879; C01B 25/37
 USPC ........................................................ 429/221
 See application file for complete search history.

(56) References Cited

U.S. PATENT DOCUMENTS

2006/0259598 A1  11/2006  Kim et al.
2007/0009801 A1  1/2007  Inagaki et al.
(Continued)

FOREIGN PATENT DOCUMENTS

CN  101443273  5/2009
JP  2001-110414 A  4/2001
(Continued)

OTHER PUBLICATIONS

Xu et al. "Continuous hydrothermal synthesis of lithium iron phosphate particles in subcritical and supercritical water", The Journal of Supercritical Fluids, vol. 44, Issue 1, Feb. 2008, pp. 92-97; http://dx.doi.org/10.1016/j.supflu.2007.09.001.*

(Continued)

*Primary Examiner* — Nicholas P D'Aniello
(74) *Attorney, Agent, or Firm* — Birch, Stewart, Kolasch & Birch, LLP.

(57) ABSTRACT

Disclosed is lithium iron phosphate having an olivine crystal structure, wherein the length in the direction [001] is greater than the length in the direction [010] when the Li+ diffusion direction is the direction [010] in the lattice structure of the crystal.

20 Claims, 7 Drawing Sheets

(51) Int. Cl.
  *C01B 25/37* (2006.01)
  *H01M 4/58* (2010.01)
  *C01B 25/45* (2006.01)
  *C01B 25/455* (2006.01)

(56) References Cited

U.S. PATENT DOCUMENTS

| | | |
|---|---|---|
| 2009/0081549 A1 | 3/2009 | Liaw et al. |
| 2009/0170003 A1 | 7/2009 | Chen et al. |
| 2010/0227221 A1 | 9/2010 | Chang et al. |
| 2010/0237275 A1 | 9/2010 | Park et al. |

FOREIGN PATENT DOCUMENTS

| | | |
|---|---|---|
| JP | 2004-055366 | 3/2004 |
| JP | 2008-541364 A | 11/2008 |
| JP | 2011-76820 A | 4/2011 |
| KR | 10-2007-0006592 A | 1/2007 |
| KR | 10-2007-0082900 A | 8/2007 |
| KR | 10-2008-0017289 A | 2/2008 |
| KR | 10-2008-0083237 A | 9/2008 |
| KR | 10-2009-0050015 A | 5/2009 |
| KR | 10-2009-0071377 A | 7/2009 |

OTHER PUBLICATIONS

Lee et al., "Synthesis of LiFePO4 micro and nanoparticles in supercritical water", Materials Letters, vol. 60, Issues 17-18, Aug. 2006, pp. 2105-2109; http://dx.doi.org/10.1016/j.matlet.2005.12.083.*

International Search Report issued in corresponding PCT/KR2011/002828, mailed on Dec. 26, 2011.

* cited by examiner

US 9,065,135 B2

CATHODE ACTIVE MATERIAL FOR SECONDARY BATTERY AND LITHIUM SECONDARY BATTERY INCLUDING THE SAME

CROSS REFERENCE TO RELATED APPLICATIONS

This application is a Continuation of PCT International Application No. PCT/KR2011/002828 filed on Apr. 20, 2011, which claims priority under 35 U.S.C. §119(a) to Patent Application No. 10-2010-0036766 filed in the Republic of Korea on Apr. 21, 2010, all of which are hereby expressly incorporated by reference into the present application.

TECHNICAL FIELD

The present invention relates to a cathode active material for secondary batteries and a secondary battery comprising the same. 11 More specifically, the present invention relates to lithium iron phosphate having an olivine crystal structure, wherein the length in the direction [001] is greater than the length in the direction [010] when the $Li^+$ diffusion direction is the direction [010] in the lattice structure of the crystal, and a lithium secondary battery comprising the olivine crystal structure-shape lithium iron phosphate as a cathode active material.

BACKGROUND ART

Carbon materials are generally used as cathode active materials for lithium secondary batteries that are being used in rapidly increasing number. Also, the use of lithium metals, sulfur compounds, silicon compounds, tin compounds and the like have been considered. Meanwhile, lithium-containing cobalt oxides ($LiCoO_2$) are generally used as cathode active materials for lithium secondary batteries. Also, the use of lithium-containing manganese oxides such as $LiMnO_2$ having a layered crystal structure and $LiMn_2O_4$ having a spinel crystal structure, and lithium-containing nickel oxide ($LiNiO_2$) as the cathode active materials has been considered.

$LiCoO_2$ is currently used owing to superior physical properties such as cycle properties, but has disadvantages of low stability, high-cost due to use of cobalt, which suffers from natural resource limitations, and limitation of mass-use as a power source for electric automobiles. $LiNiO_2$ is unsuitable for practical application to mass-production at a reasonable cost due to many features associated with preparation methods thereof. Lithium manganese oxides such as $LiMnO_2$ and $LiMn_2O_4$ have a disadvantage of poor cycle properties.

In recent years, methods to use a lithium transition metal phosphate as a cathode active material have been researched. Lithium transition metal phosphates are largely divided into $Li_xM_2(PO_4)_3$ having a Nasicon structure and $LiMPO_4$ having an olivine structure, and are found to exhibit superior high-temperature stability, as compared to conventional $LiCoO_2$. To date, $Li_3V_2(PO_4)_3$ is the most widely known Nasicon structure compound, and $LiFePO_4$ and $Li(Mn,Fe)PO_4$ are the most widely known olivine structure compounds.

Among olivine structure compounds, $LiFePO_4$ has a high output voltage of 3.5V, a high volume density of 3.6 $g/cm^3$, and a high theoretical capacity of 170 mAh/g, as compared to lithium (Li), and exhibits superior high-temperature stability, as compared to cobalt (Co), and utilizes cheap Fe as an ingredient, thus being highly applicable as a cathode active material for lithium secondary batteries.

However, active materials used for lithium secondary batteries require high density and rate properties. Such a $LiFePO_4$ exhibits considerably low $Li^+$ diffusion rate and electrical conductivity. For this reason, when $LiFePO_4$ is used as a cathode active material, internal resistance of batteries disadvantageously increases. As a result, when battery circuits are closed, polarization potential increases, thus decreasing battery capacity.

In order to solve these problems, Japanese Patent Application Publication No. 2001-110414 suggests incorporation of conductive materials into olivine-type metal phosphates in order to improve conductivity.

However, $LiFePO_4$ is commonly prepared using $Li_2CO_3$ or LiOH as a lithium source, by solid state methods, hydrothermal methods and the like. Lithium sources and carbon sources added to improve conductivity disadvantageously cause a great amount of $Li_2CO_3$.

Such $Li_2CO_3$ is degraded during charging, or reacts with an electrolyte solution to produce a $CO_2$ gas, thus disadvantageously causing production of a great amount of gases during storage or cycles. As a result, disadvantageously, swelling of batteries is generated and high-temperature stability is deteriorated.

In addition, diffusion distance may be decreased through reduction of particles of $LiFePO_4$. In this case, a high cost is required for battery manufacture due to high BET.

Accordingly, there is an increasing need for lithium iron phosphates that do not cause generation of impurities, maintain a suitable particle size and do not lead to side effects associated with $Li^+$ diffusion or electrical conductivity.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present invention have discovered that lithium iron phosphate having an olivine crystal structure in which a length of a $Li^+$ diffusion direction satisfies the following specific conditions in crystal lattice structures exhibits superior $Li^+$ diffusion rate in spite of large particle size, thus reducing battery manufacturing costs. Based on this discovery, the present invention has been completed.

Technical Solution

In accordance with one aspect of the present invention, provided is lithium iron phosphate having an olivine crystal structure, wherein the length in the direction [001] is greater than the length in the direction [010] when the $Li^+$ diffusion direction is the direction [010] in the lattice structure of the crystal.

In the crystal structure, x, y and z axes (or a, b and c directions) are represented by [100], [010] and [001]. Accordingly, in this specification, "the length in the direction [001] is greater than the length in the direction [010] when the $Li^+$ diffusion direction is the direction [010] in the lattice structure of the crystal" means that, the length in a z-axis direction is greater than the length in a y-axis direction, when $Li^+$ diffusion direction is a y-axis direction. That is, this expression means the length in the direction perpendicular to the $Li^+$ diffusion direction is greater than the length in the $Li^+$ diffusion direction.

In a preferred embodiment, the direction [001] may be a crystal growth direction. In this case, crystals are not grown in the Li$^+$ diffusion direction anymore and are grown only in a perpendicular direction thereof. As a result, in spite of growth of crystals, the distance in which Li$^+$ particles diffuse can be maintained. Li$^+$ diffusion rate is inversely proportional to distance. As mentioned above, crystals are grown only in the direction [001] and Li$^+$ diffusion rate is not deteriorated.

The length in the direction [001] is preferably two or more times, more preferably, 2- to 50-times, of the length in the direction [010]. Accordingly, the crystals may have a shape of rod, rather than spherical shape. When the length in the direction [001] is less than two or more times the length in the direction [010], Li$^+$ diffusion rate relative to particle size cannot be obtained to a desired level, and on the other hand, when the length in the direction [001] is excessively high, the length of particles is excessively great and problems associated with formation of secondary particles may be present.

Meanwhile, in the lattice structure, the symbol "[ ]" is used to represent direction, and the symbol "( )" is used to represent plane. Here, the value in the symbol "( )" represents an inverse number of points that contact x, y and z axes. That is, the plane perpendicular to the x axis may be a contact point with respect to each axis (1∞∞) and an inverse number thereof is (100). That is, the plane perpendicular to the direction [010] is (100).

In such a representation manner, crystals of lithium iron phosphate of the present invention may have various phases of the plane (001) and preferably have a circular or oval shape. However, the shape of the plane (001) may be varied when the length in the direction [001] is greater than the length in the direction [010].

The macro-morphology of lithium iron phosphate particles of the present invention is not particularly limited and, in the afore-mentioned embodiment, may be a rod shape obtained by continuously growing crystals in a direction perpendicular to a predetermined length in the Li$^+$ diffusion direction.

In such a rod structure, the macro-morphology of particles in the direction [001] may be a bent shape with a predetermined angle. For example, in the macro-morphology, the rod particles may be bent at an angle of 20 to 50 degrees, based on the direction [001].

In a preferred embodiment, the olivine-type lithium iron phosphate may be a compound having a structure of the following formula 1.

$$Li_{1+a}Fe_{1-b}M_b(PO_{4-c})X_c \qquad (1)$$

wherein

M represents at least one selected from Al, Mg and Ti,
X represents at least one selected from F, S and N, and
−0.5≤a≤+0.5, 0≤b≤0.5, 0≤c≤0.1.

The olivine-type lithium iron phosphate according to the present invention may be prepared by any method so long as the method enables formation of the afore-mentioned particles.

For example, the olivine-type lithium iron phosphate may be prepared by rapid reaction for a short reaction time. It is thought that the specific particle shape mentioned above is formed by asymmetrically growing crystals along a thermodynamically stable crystal plane in the rapid reaction process. For example, if the layer-shaped structure of lithium iron phosphate is continuously grown, crystals are continuously grown from the end of the layer, while the growth in the interlayer direction perpendicular to the layer is relatively limited and a macroscopically long rod structure is thus formed. For example, the reaction time for rapid reaction may be 0.5 seconds to one minute, preferably, one second to 10 seconds.

In a preferred embodiment, the rapid reaction may be carried out by a continuous super-critical hydrothermal process or a microwave process.

The process for preparing lithium iron phosphate including a continuous super-critical hydrothermal process for example includes the following (a) to (c).

(a) primarily mixing a starting material, an alkalinizing agent and the like to precipitate a transition metal hydroxide;

(b) secondarily mixing the mixture obtained in step (a) with supercritical or subcritical water to synthesize a lithium metal composite oxide, followed by drying; and (c) calcining the synthesized lithium metal composite oxide.

In step (a), as a starting material, a lithium precursor may be Li$_2$CO$_3$, Li(OH), Li(OH).H$_2$O, LiNO$_3$ and the like, and an iron (Fe) precursor may be a compound containing a bivalent iron such as FeSO$_4$, FeC$_2$O$_4$.2H$_2$O, or FeCl$_2$, and a phosphorous (P) precursor may be an ammonium salt such as H$_3$PO$_4$, NH$_4$H$_2$PO$_4$, (NH$_4$)$_2$HPO$_4$, or P$_2$O$_5$.

In addition, examples of the alkalinizing agent include alkali metal hydroxides, alkaline earth metal hydroxides, ammonia compounds and the like. In step (b), supercritical or subcritical water may be water at 200 to 700° C. at a pressure of 180 to 550 bar and the calcination temperature in step (c) may be 600 to 1200° C.

The present invention provides lithium iron phosphate particles constituting secondary particles that have a mean particle diameter (D50) of 5 to 100 μm and take the form of aggregates of the primary particles.

When the size of the primary particles is small, handling during the preparation process is difficult and preparation costs disadvantageously increase. In order to solve this disadvantage, secondary particles may be formed by aggregating primary particles having a small particle diameter. However, when almost no pores are present between primary particles, particle diameter substantially increases due to strong bonding force and electrical conductivity is disadvantageously deteriorated.

Accordingly, the present inventors discovered that when secondary particles are prepared using the primary particles, secondary particles have a high porosity.

The present inventors discovered that when secondary particles having a high porosity are prepared, the shape of secondary particles is at least partially deformed in the pressing process during fabrication of electrodes using the same and may return to the primary particles and, as a result, electrical conductivity is improved.

That is, the olivine-type lithium iron phosphate particle according to the present invention is a secondary particle (aggregate of primary particles), has a high porosity, thus satisfying high electrical conductivity and density (advantages of the primary particles) and high process efficiency (advantage of secondary particles). Specifically, when an electrode mix is prepared from secondary particles, amounts of binder and solvent used can be reduced and mixing and drying periods can be shortened.

Accordingly, use of the olivine-type lithium iron phosphate particle according to the present invention for fabrication of secondary batteries ultimately enables maximization of capacities of electrodes and batteries and energy density.

In the olivine-type lithium iron phosphate particle according to the present invention, porosity of secondary particles is preferably 15 to 40% so that the secondary particles can return to the primary particles when the electrode is pressed.

When the porosity of the secondary particles is lower than 15%, it is undesirable in that a pressure not lower than a pressure that is commonly applied in the process of pressing electrodes should be applied in order to obtain fine particles. In addition, when the porosity exceeds 40%, handling is disadvantageously difficult due to low bonding force between primary particles. Furthermore, in terms of uniform dispersion of primary particles and process efficiency, the porosity of secondary particles is more preferably 20 to 30%.

The pores present in the secondary particles may be of a closed or open-type. In terms of easy conversion into primary particles and uniform dispersion, the secondary particles are preferably provided with a plurality of small pores. Accordingly, the size of pores is preferably 200 to 700 nm, more preferably 300 to 600 nm.

Meanwhile, although secondary particles are deformed and converted into primary particles during fabrication of electrodes, formation of secondary particles using crystallized primary particles is preferred in order to realize superior electrical conductivity, stability of crystal structures, and high tap density. That is, preferably, the primary particles each independently have an olivine-type crystal structure.

On the other hand, for example, when secondary particles are obtained by aggregating primary particles, followed by calcination and crystallization, high pressure to return the secondary particles to the primary particles should be applied due to high bonding force between primary particles and crystal structures are also deformed when secondary particles are deformed, thus being undesirable in terms of difficulty of realizing the effect of improvement in conductivity based on small particle diameter.

In addition, in terms of facilitation of conversion into primary particles, secondary particles are preferably formed by aggregating the primary particles through physical bonding such as van der Waals' force rather than chemical bonding such as covalent bonding or ionic bonding.

When the mean particle diameter of primary particles is excessively large, improvement in ionic conductivity cannot be attained to a desired degree, and on the other hand, particles having an excessively small mean particle diameter are not easy to prepare. In consideration of these aspects, the mean particle diameter (D50) of the primary particle is preferably 50 to 550 nm, more preferably 100 to 300 nm.

In addition, when the mean particle diameter of secondary particles is excessively large, pores between secondary particles increase and tap density is disadvantageously deteriorated. On the other hand, when the particle diameter is excessively small, process efficiency is poor. Accordingly, secondary particles preferably have a mean particle diameter (D50) of 5 to 100 μm, more preferably, a mean particle diameter of 5 to 40 μm in terms of slurry mixing and evenness of electrode surface. When the mean particle diameter is 40 μm or more, disadvantageously, precipitation gradually occurs during slurry mixing.

The secondary particle preferably has a specific surface area (BET) of 10 m$^2$/g.

In addition, the shape of secondary particles is not particularly limited and is preferably a spherical shape in terms of tap density.

In a preferred embodiment, the olivine-type lithium iron phosphate may have a volume density of 0.5 to 1.5 g/mL. When the volume density is within this range, a contact area between the conductive materials can be maintained at a high level, formation of a superior conductive network is possible, and electrical conductivity is superior.

The method for preparing lithium iron phosphate particles according to the present invention is not particularly limited.

In a preferred embodiment, the method may include the following (1) to (3).

(1) preparing primary particles having an olivine crystal structure;

(2) preparing a mixture of the primary particles, a binder and a solvent; and (3) drying the mixture and aggregating the primary particles to prepare secondary particles.

In some cases, the method may include after step (1) and before step (2), washing to remove salt impurities that may remain in the primary particles (such as $NH_4NO_3$), ionic impurities (such as $NO_3^-$ and $SO_4^{2-}$ degraded from metal precursors) and the like.

In step (2), preferably, the content of primary particles in the mixture is 5 to 20 wt %, based on the weight of the solvent and the content of the binder is 5 to 20 wt % based on the weight of the solvent. At this time, internal porosity of secondary particles can be controlled by controlling a ratio of the primary particles to the solvent. The drying and preparation of secondary particles in step (3) may be simultaneously performed by various methods known in the art, including spray drying, fluidized-bed drying, vibration drying, etc. In particular, rotating spray drying is preferred, because it enables preparation of secondary particles in the form of spheres and thus improves tap density.

The drying temperature may be 120 to 200° C. and step (3) is preferably carried out under an inert gas (e.g., Ar, $N_2$) atmosphere.

The present invention provides a cathode mix for secondary batteries comprising olivine-type lithium iron phosphate as a cathode active material. The cathode mixture may further optionally comprise a conductive material, a binder, a filler and the like, in addition to the cathode active material.

The conductive material is commonly added in an amount of 1 to 30% by weight, based on the total weight of the mixture comprising the cathode active material. Any conductive material may be used without particular limitation so long as it has suitable conductivity without causing adverse chemical changes in the battery. Examples of conductive materials include conductive materials, including graphite; carbon blacks such as carbon black, acetylene black, Ketjen black, channel black, furnace black, lamp black and thermal black; conductive fibers such as carbon fibers and metallic fibers; metallic powders such as carbon fluoride powders, aluminum powders and nickel powders; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 30% by weight, based on the total weight of the mixture comprising the cathode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

Meanwhile, the cathode active material may be composed of only the olivine-type lithium iron phosphate and a combination of olivine-type lithium iron phosphate and lithium-containing transition metal oxide, if necessary.

Examples of the lithium transition metal composite oxide include, but are not limited to, layered compounds such as lithium cobalt oxide ($LiCoO_2$) and lithium nickel oxide ($LiNiO_2$), or compounds substituted with one or more transition metals; lithium manganese oxides such as compounds of formula $Li_{1+y}Mn_{2-y}O_4$ ($0 \leq y \leq 0.33$), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; Ni-site type lithiated nickel oxides of Formula $LiNi_{1-y}M_yO_2$ (M=Co, Mn, Al, Cu, Fe, Mg, B or Ga, and $0.01 \leq y \leq 0.3$); lithium manganese composite oxides of Formula $LiMn_{2-y}M_yO_2$ (M=Co, Ni, Fe, Cr, Zn or Ta, and $0.01 \leq y \leq 0.1$), or formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$.

The present invention provides a cathode wherein the cathode mix is applied to a collector.

The cathode for secondary batteries may be prepared by applying a slurry obtained by mixing the cathode mix with a solvent such as NMP to a cathode current collector, followed by drying and press-rolling.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, these current collectors may also be processed to form fine irregularities on the surface thereof so as to enhance adhesive strength to the cathode active materials. In addition, the current collectors may be used in various forms including films, sheets, foils, nets, porous structures, foams and non-woven fabrics.

The present invention provides a lithium secondary battery comprising the cathode, the anode, a separator, and a lithium salt-containing non-aqueous electrolyte.

For example, the anode is prepared by applying an anode mix comprising an anode active material to an anode current collector, followed by drying. The anode mix may comprise the afore-mentioned ingredients, i.e., the conductive material, the binder and the filler, if necessary.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material is more preferred. The material may be used alone or in combination of two or more thereof.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolyte solution, solid electrolyte and inorganic solid electrolyte may be utilized.

Examples of the non-aqueous electrolyte solution that can be used in the present invention include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention, include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like.

The lithium secondary batteries according to the present invention may be fabricated by a common method known in the art. In addition, in the lithium secondary batteries according to the present invention, the structures of cathode, anode and separator are not particularly limited and, for example, the lithium secondary batteries have a structure in which respective sheets are inserted into a cylindrical, rectangular or pouch case in a winding or stacking manner.

The present invention provides a medium and large battery pack comprising the lithium secondary batteries as unit batteries.

The middle and large battery pack may be used for various devices requiring high rate properties and high-temperature stability and examples thereof include power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooter); electric golf carts and the like.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only to illustrate the present invention and should not be construed as limiting the scope and spirit of the present invention.

Example 1

A first fluid stream containing an aqueous solution of iron sulfate, phosphoric acid and sugar and a second fluid stream containing a mixture of ammonia and an aqueous lithium hydroxide solution were pumped under pressurization at a rate of 5 ml/min and a pressure of 270 bar, a fourth fluid stream containing 460° C. ultrapure water was pumped under pressurization to a third fluid stream supplied from the first reactor at a rate of 100 ml/min at the same pressure, followed by mixing in a second reactor.

In the first fluid stream, the mixed aqueous solution consists of 22 parts by weight of iron sulfate and 9 parts by weight of phosphoric acid (84 wt %), and 10% by weight of sugar is contained, based on the weight of iron sulfate. The second fluid stream consists of 1.4% by weight of ammonia and 6.5% by weight of aqueous lithium hydroxide.

The mixture obtained from the second reactor was allowed to stand in an about 400° C. third reactor for 10 seconds, cooled, concentrated, spray-dried at 130° C., and calcined under a nitrogen atmosphere at 650° C. for 11 hours to prepare lithium iron phosphate.

Comparative Example 1

$LiOH-H_2O$, $FeSO_4$ and $H_3PO_4$ were added at a molar ratio of 3:1:1 ($LiOH-H_2O$:$FeSO_4$:$H_3PO_4$) to an autoclave by a hydrothermal method and stirred using an impeller while an internal temperature was elevated to 200° C., to prepare lithium iron phosphate.

Test Example 1

Figure 1:
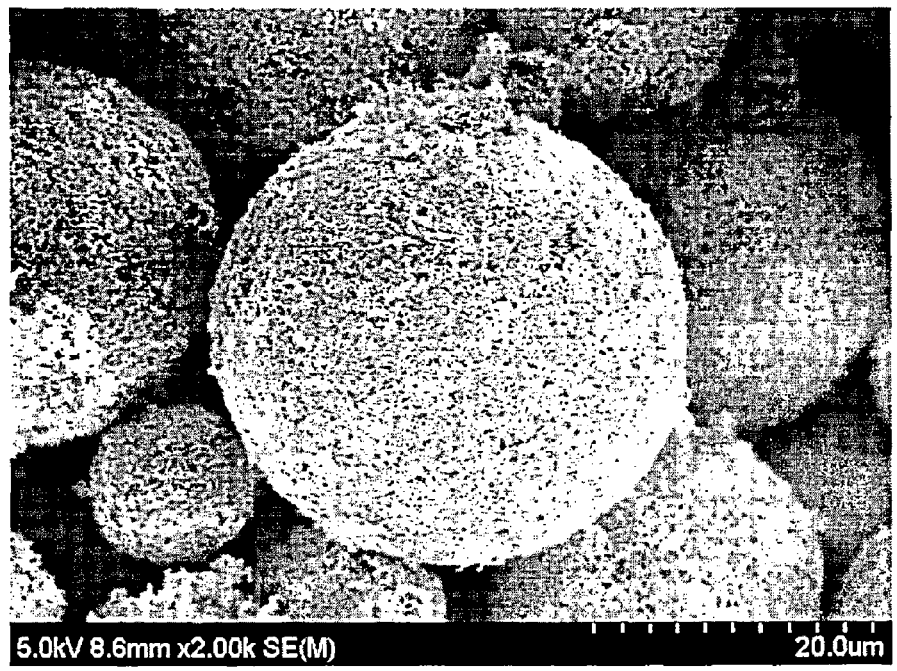
FIG. 1 is an SEM image of a lithium iron phosphate having an olivine crystal structure (secondary particle) prepared in Example 1.
Figure 2:
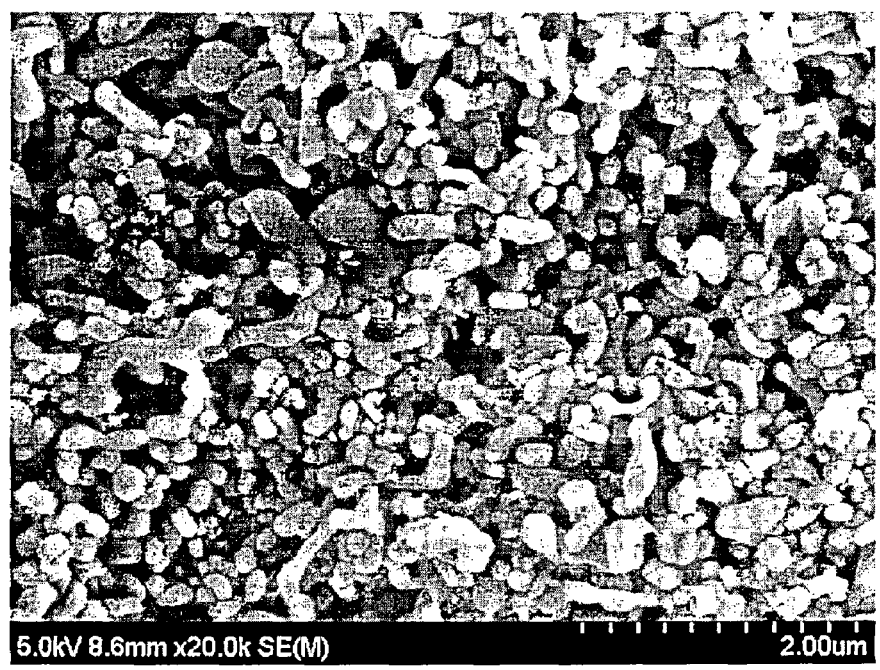
FIGS. 2 and 3 are enlarged images of FIG. 1.
Figure 3:
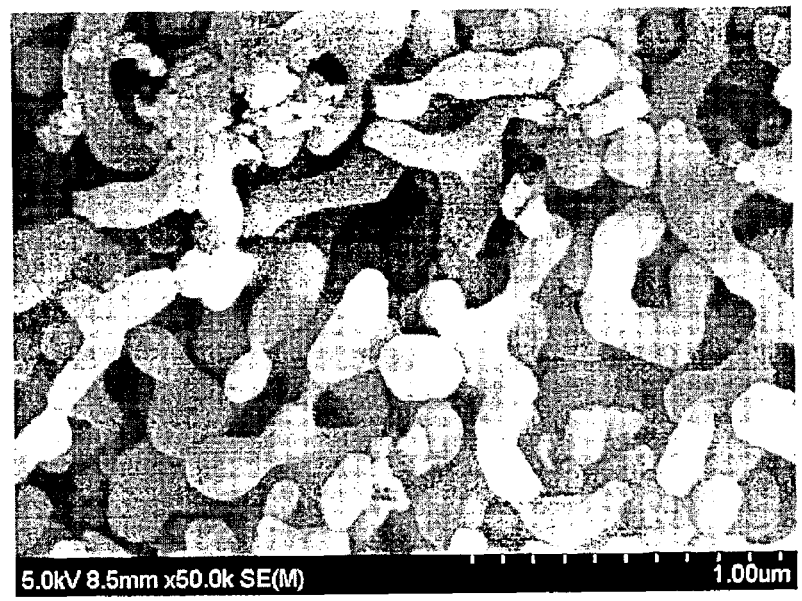

An SEM image of lithium iron phosphate having an olivine crystal structure (secondary particle) prepared in Example 1 is shown in FIG. 1 and an enlarged image thereof is shown in FIGS. 2 and 3.

As shown in FIG. 1, the particles of lithium iron phosphate have an overall spherical shape, and, as shown in FIGS. 2 and 3, secondary particles have a structure in which primary particles are aggregated at high porosity. As a result of measurement, porosity was about 28%.

The primary particles are aggregated at a high porosity through physical bonding to constitute secondary particles. Accordingly, when electrodes are fabricated using these secondary particles, secondary particles are deformed in the pressing process and then converted into primary particles, thus exerting superior electrical conductivity.

In addition, as shown in FIG. 3, a plurality of primary particles have an overall rod structure. An SEM image of one primary particle is shown in FIG. 4.

Figure 4:
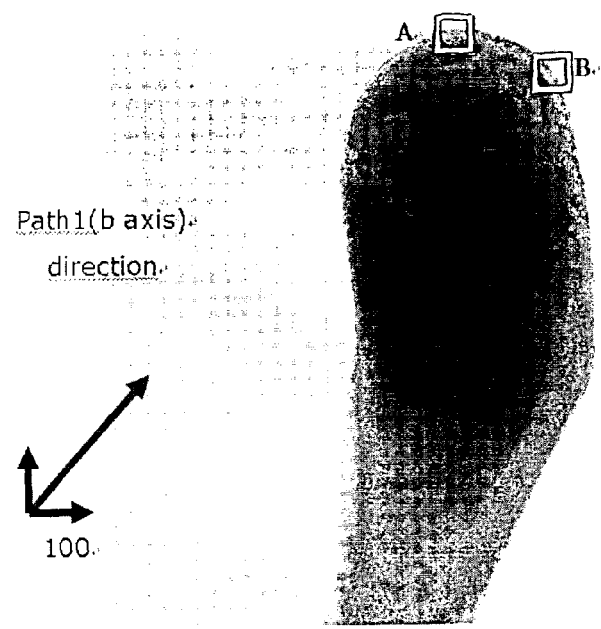
FIG. 4 is an SEM image of lithium iron phosphate having an olivine crystal structure (primary particle) prepared in Example 1.

Referring to FIG. 4, primary particles of lithium iron phosphate have a substantially cylindrical shape, and, in the crystal lattice structure, the horizontal direction of FIG. 4 may be represented by the direction [100], a direction perpendicular thereto may be represented by the direction [001], and a direction perpendicular to the ground may be represented by the direction [010]. It can be seen that the length in the direction [001] may be two or more times the length in the direction [010]. In such a structure, $Li^+$ diffusion primarily occurs in the direction [010] and growth of crystals occurs in the direction [001]. Accordingly, although particles are continuously grown in the process of preparing lithium iron phosphate, the length in the direction [010] is not greatly varied and does not have a great effect on $Li^+$ diffusion rate.

Figure 5:
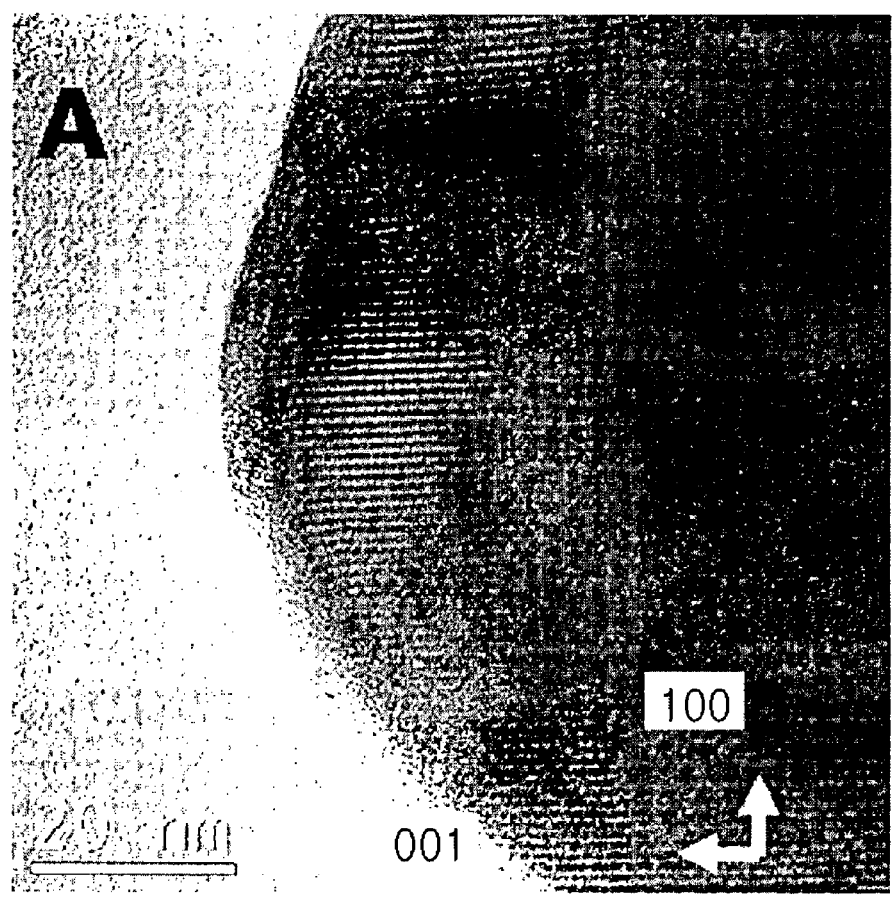
FIG. 5 is an enlarged image of the part "A" of FIG. 4 (rotated by an angle of 90 degrees to the left)
Figure 6:
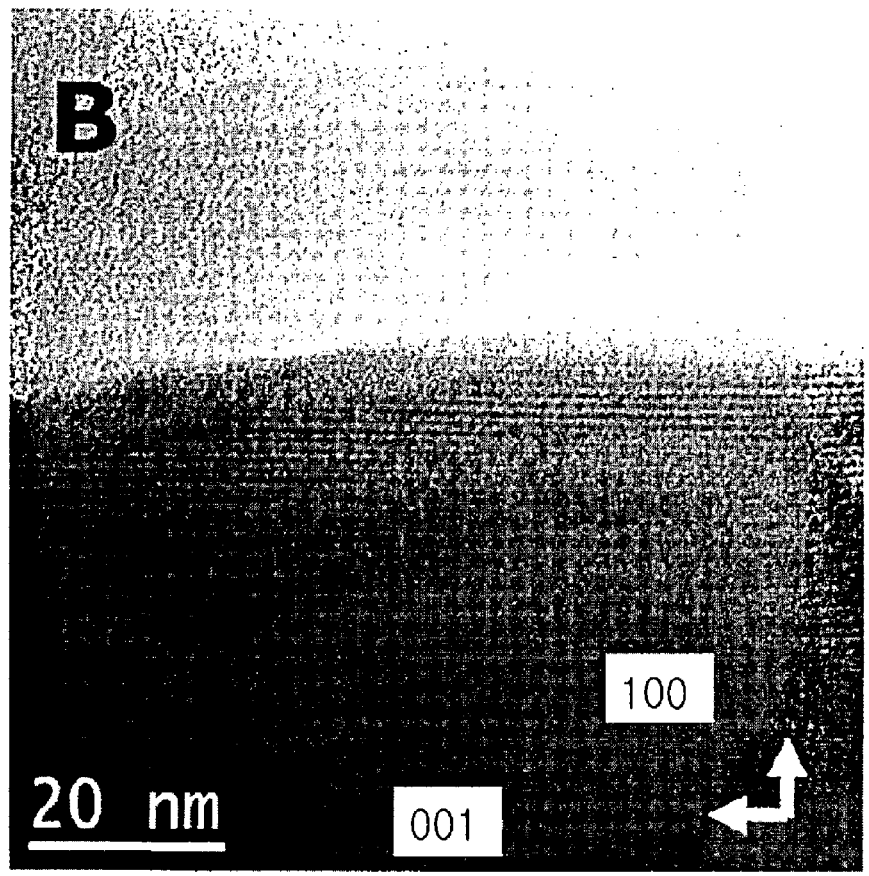
FIG. 6 is an enlarged image of the part "B" of FIG. 4 (rotated by an angle of 90 degrees to the left)

FIGS. 5 and 6 are enlarged images of the parts "A" and "B" of FIG. 4.

Referring to these drawings, lithium iron phosphate particles have a layered structure and crystal growth in the direction [001] occurs at the end of the layer and hardly occurs in the direction [010] and the direction [100], perpendicular to the direction [001], that is, in interlayer directions.

As mentioned above, through such a specific crystal structure, problems of lithium iron phosphate, electrical conductivity and deterioration in $Li^+$ diffusion can be greatly reduced.

Example 2

90% by weight of lithium iron phosphate prepared in Example 1 (as a cathode active material), 5% by weight of Super-P (as a conductive material) and 5% by weight of PVdF (as a binder) were added to NMP, to prepare a cathode mixture slurry. The slurry was coated on one surface of an aluminum foil, followed by drying and pressing, to manufacture a cathode.

Comparative Example 2

A cathode was manufactured in the same manner as in Example 2, except that lithium iron phosphate prepared in Comparative Example 1 was used as a cathode active material.

Test Example 2

The resistance and electrical conductivity of the electrode (cathode) of Example 2 and electrode (cathode) of Comparative Example 2 were measured. The results are shown in FIG. 7.

Figure 7:
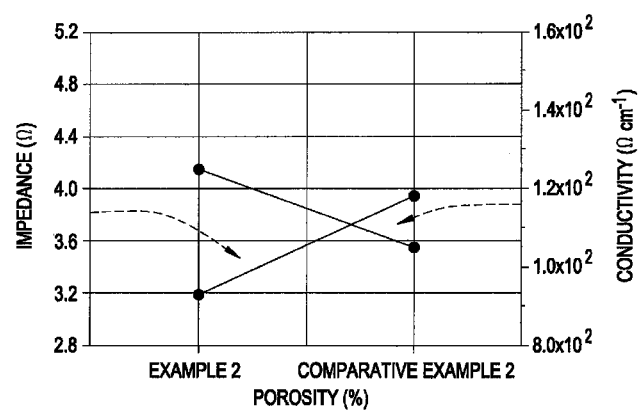
FIG. 7 is a graph showing test results of resistance and electrical conductivity of the electrode of Example 2 and the electrode of Comparative Example 2 in Test Example 2.

As shown in FIG. 7, the electrode of Example 2 exhibited considerably low resistance and high electrical conductivity, as compared to the electrode of Comparative Example 2. The reason for this is that lithium iron phosphate particles of Example 2 have a rod shape and a small BET, thus exhibiting better carbon coating effects than Comparative Example 2, although the same amount (2.2 wt %) of carbon is coated on lithium iron phosphate.

Example 3

97% by weight of lithium iron phosphate prepared in Example 1, as a cathode active material, and 5% by weight of PVdF (binder) were added to NMP, to prepare a cathode mixture slurry. The slurry was coated on one surface of an aluminum foil, followed by drying and pressing, to manufacture a cathode.

An electrode assembly in which Cell Guard™ as a separator is interposed between Li metal foils as the cathode and the anode was manufactured, and a lithium non-aqueous electrolyte solution containing 1M $LiPF_6$ was added to a mixed solvent of cyclic and linear carbonates to manufacture a battery.

Comparative Example 3

A battery was manufactured in the same manner as in Example 3, except that 96% by weight of lithium iron phosphate was used as a cathode active material for manufacturing a cathode and 4% by weight of PVdF was used as a binder.

Test Example 3

First, the reason for using the binder in a greater amount in the process of manufacturing the cathode for the battery of Comparative Example 3, as compared to the battery of Example 3 is that lithium iron phosphate particles of Comparative Example 1 used for Comparative Example 3 have a spherical shape and a high BET, thus exerting bonding force when the content of binder is 4% by weight or more.

In addition, a conductive material was not added for manufacture of the cathodes of Example 3 and Comparative Example 3 in order to confirm charge and discharge properties in a state that the effects of conductive material on $Li^+$ diffusion rate are excluded.

Figure 8:
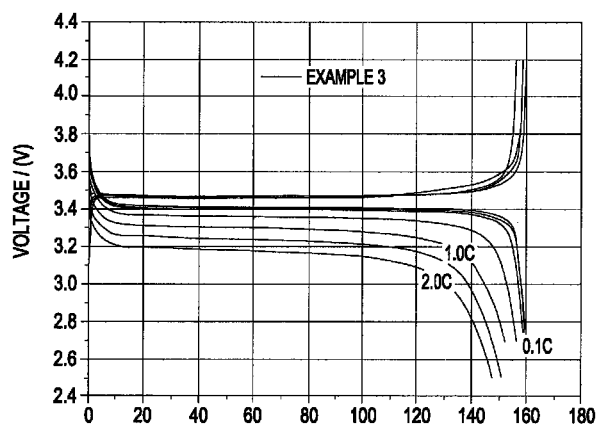
FIGS. 8 and 9 are graphs showing charge and discharge test results of the battery of Example 3 and the battery of Comparative Example 3 in Test Example 3.
Figure 9:
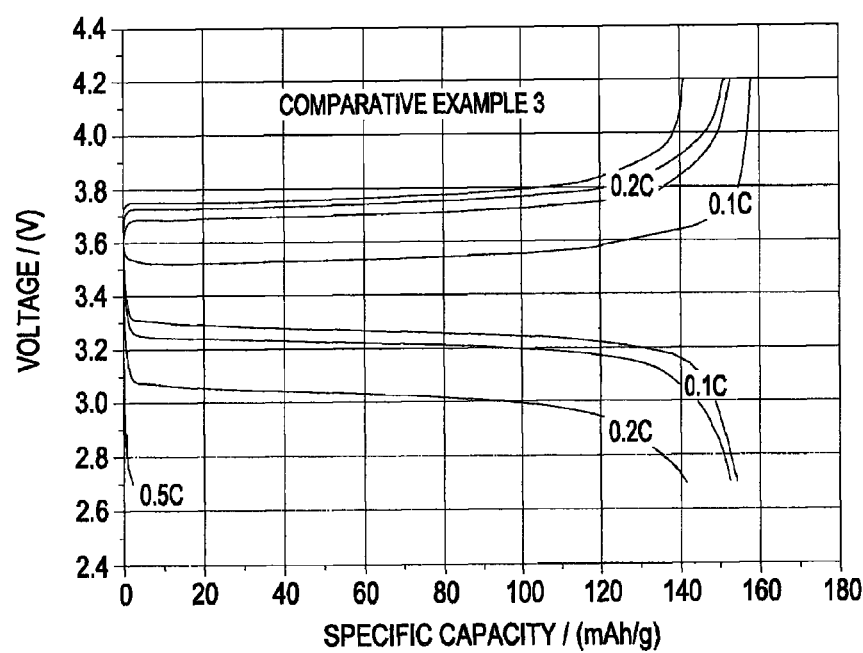

Under these conditions, the battery of Example 3 and the battery of Comparative Example 3 were charged and discharged. The results are shown in FIGS. 8 and 9. For reference, the battery of Comparative Example 3 exhibited great reduction in cost under 0.5 C charge/discharge conditions and could not be charged and discharged under 1 C conditions.

Referring to FIGS. 8 and 9, the battery of Example 3 exhibited considerably superior charge/discharge properties, as compared to the battery of Comparative Example 3. The reason for this is that lithium iron phosphate of Example 1 used for the battery of Example 3 exhibits high $Li^+$ diffusion rate due to lattice structure and superior charge/discharge properties although additional conductive material was not added.

In addition, since particles have a rod shape, production of large particles is possible without affecting $Li^+$ diffusion distance, which means that use of a small amount of binder is possible. Accordingly, manufacture of electrodes with a considerably high energy density is possible and fabrication of batteries with a high capacity is thus possible.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, the lithium iron phosphate having an olivine crystal structure according to the present invention has a specific crystal structure, thus advantageously enabling preparation of a cathode active material that does not affect $Li^+$ diffusion in spite of large particle size and thus exhibits superior performance at low cost.

The invention claimed is:

1. Secondary lithium iron phosphate particles which are comprised of aggregated primary lithium iron phosphate particles, wherein the primary lithium iron phosphate particles have an olivine crystal structure, wherein a length of the primary lithium iron phosphate particles in a direction [001] is greater than a length in a direction [010] such that a $Li^+$ diffusion direction is in the direction [010] in the lattice structure of the crystal,
    wherein the macro-morphology of a majority of the primary particles is a rod structure and is bent at a predetermined angle in the direction [001].

2. The secondary lithium iron phosphate particles according to claim 1, wherein the direction [001] is a direction in which the primary particles are grown.

3. The secondary lithium iron phosphate particles according to claim 1, wherein the length of the primary particles in the direction [001] is two or more times the length of the primary particles in the direction [010].

4. The secondary lithium iron phosphate particles according to claim 3, wherein the length of the primary particles in the direction [001] is within 2 to 50 times the length of the primary particles in the direction [010].

5. The secondary lithium iron phosphate particles according to claim 1, wherein the plane (001) of the crystal has a circular or oval shape.

6. The secondary lithium iron phosphate particles according to claim 1, wherein the primary particles are bent at an angle of 20 to 50 degrees.

7. The secondary lithium iron phosphate particles according to claim 1, wherein the primary particles comprise lithium iron phosphate having a structure of the following formula 1:

$$Li_{1+a}Fe_{1-b}M_b(PO_{4-c})X_c \quad (1)$$

wherein
    M represents at least one selected from Al, Mg and Ti,

X represents at least one selected from F, S and N, and −0.5≤a≤+0.5, 0≤b≤0.5, 0≤c≤0.1.

8. The secondary lithium iron phosphate particles according to claim 1, wherein the primary particles are prepared by rapid reaction for a short reaction time.

9. The secondary lithium iron phosphate particles according to claim 8, wherein a reaction time of the rapid reaction is 0.5 seconds to 1 minute.

10. The secondary lithium iron phosphate particles according to claim 8, wherein the rapid reaction is carried out by a continuous supercritical hydrothermal method.

11. An olivine-type secondary lithium iron phosphate particles, in which primary lithium iron phosphate particles according to claim 1 are aggregated to form secondary particles having an average particle diameter of 5 to 100 μm and a porosity of 15 to 40%.

12. The olivine-type secondary lithium iron phosphate particles according to claim 11, wherein a size of pores present in the secondary particles is 300 to 600 nm.

13. The olivine-type secondary lithium iron phosphate particles according to claim 11, wherein the primary particles are aggregated by physical bonding to form secondary particles.

14. The olivine-type secondary lithium iron phosphate particles according to claim 11, wherein a mean particle diameter of the primary particles is 100 to 300 nm, and a mean particle diameter of the secondary particles is 5 to 40 μn.

15. The olivine-type secondary lithium iron phosphate particles according to claim 12, wherein the secondary particles have a spherical shape.

16. A cathode mix for secondary batteries comprising the secondary lithium iron phosphate particles according to claim 1 as a cathode active material.

17. A cathode for secondary batteries in which the cathode mix for secondary batteries according to claim 16 is applied to a current collector.

18. A lithium secondary battery comprising the cathode for secondary batteries according to claim 17.

19. A battery pack comprising the lithium secondary battery according to claim 18 as a unit battery.

20. The battery pack according to claim 19, wherein the battery pack is suitable for use as a power source of a power tool, an electric vehicle, an electric two-wheeled vehicle, or an electric golf cart.

* * * * *